United States Patent
Peloquin et al.

(10) Patent No.: US 6,574,705 B1
(45) Date of Patent: Jun. 3, 2003

(54) DATA PROCESSING SYSTEM AND METHOD INCLUDING A LOGICAL VOLUME MANAGER FOR STORING LOGICAL VOLUME DATA

(75) Inventors: Mark A. Peloquin, Austin, TX (US); Benedict Michael Rafanello, Round Rock, TX (US); Cuong Huu Tran, Austin, TX (US); Cristi Nesbitt Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 09/714,730

(22) Filed: Nov. 16, 2000

(51) Int. Cl.$^7$ .............................................. G06F 12/00
(52) U.S. Cl. ..................... 711/114; 711/111; 711/112; 714/8; 707/205
(58) Field of Search .................... 711/114, 111–112; 707/205; 714/8; 717/167

(56) References Cited

U.S. PATENT DOCUMENTS

| | | | |
|---|---|---|---|
| 5,129,088 A | | 7/1992 | Auslander et al. .............. 711/1 |
| 5,408,630 A | | 4/1995 | Moss ........................ 711/112 |
| 5,537,578 A | | 7/1996 | Day, III et al. ............. 711/165 |
| 5,546,557 A | | 8/1996 | Allen et al. ................. 711/111 |
| 5,822,142 A | | 10/1998 | Hicken ........................ 360/53 |
| 5,897,661 A | * | 4/1999 | Baranovsky et al. ........ 711/170 |
| 5,907,672 A | | 5/1999 | Matze et al. .................... 714/8 |
| 5,956,745 A | * | 9/1999 | Bradford et al. ............ 711/137 |
| 5,991,542 A | | 11/1999 | Han et al. .................... 717/167 |
| 6,032,161 A | | 2/2000 | Fuller ........................ 707/205 |

FOREIGN PATENT DOCUMENTS

WO    WO 98/04981    2/1998

OTHER PUBLICATIONS

IBM Technical Disclosure Bulletin, "Shared Memory Cluster—A Scalable Multiprocessor Design", vol. 37, No. 06A, Jun. 1994, pp. 503–507.

IBM Technical Disclosure Bulletin, "Extendable Random Access Memory File System", vol. 38, No. 05, May 1995, pp. 229–232.

IBM Technical Disclosure Bulletin, "Enabling Standard Caching for Magneto Optic File Systems", vol. 28, No. 05, May 1995, pp. 339–341.

* cited by examiner

*Primary Examiner*—Do Hyun Yoo
*Assistant Examiner*—Nasser Moazzami
(74) *Attorney, Agent, or Firm*—Duke W. Yee; David A. Mims, Jr.; Lisa L. B. Yociss

(57) ABSTRACT

A data processing system and method are disclosed for storing logical volume information used by a logical volume manager to create and manage a logical volume. The data processing system includes a plurality of storage devices. A plurality of physical partitions within the plurality of storage devices are specified. Each one of the physical partitions includes a plurality of sectors. The specified physical partitions are logically combined to create the logical volume. A first plurality of the sectors are reserved in each of the physical partitions for the logical volume information. The first plurality of sectors are located at the top of each of the physical partitions. The logical volume information is stored in the first plurality of sectors in each of the physical partitions. In this manner, the logical volume information is stored at the top of each of the physical partitions.

30 Claims, 4 Drawing Sheets

DATA PROCESSING SYSTEM AND METHOD INCLUDING A LOGICAL VOLUME MANAGER FOR STORING LOGICAL VOLUME DATA

BACKGROUND OF THE INVENTION

1. Technical Field

The present invention relates to data processing systems, and further to a data processing system and method including a logical volume manager for storing a logical volume information. More particularly, the present invention relates to a data processing system and method including a logical volume manager for storing logical volume information at the top of each physical partition which is combined to create the logical volume.

2. Description of Related Art

IBM's OS/2 operating system includes a function referred to as the Logical Volume Manager, or "LVM". For systems without an LVM, each one of the physical partitions that is usable by the operating system is assigned a drive letter, such as "C:" or "F:", producing a correlating drive letter for each physical partition on a disk in the computer system. The process which assigns these letters is commonly known. For systems with an LVM, a drive letter may be mapped instead to a logical volume which may contain one or more physical partitions. The process by which physical partitions are combined into a single entity is known generically as "aggregation."

It is necessary to have a storage area where LVM specific information is stored. This storage area must be accessible to only the LVM, and not to users. Further, the storage area must be located such that it would not prevent the disk drive from being shared with other operating systems.

The information stored in this storage area allows the LVM to re-create the volume every time the system is booted. Thus, the LVM allows groupings of physical partitions to appear to the operating system as a single entity with a single drive letter assignment.

An LVM offers various features, such as Bad Block Relocation, Drive Linking, Encryption, Software RAID, and Mirroring. These features represent a sample list of possible features, but in no way limits the number of types of features that could be made available. Bad Block Relocation is a method of reserving sectors and automatically remapping unwritable sectors to available reserved sectors. Drive Linking allows multiple partitions from one or more physical drives to be combined into one logical storage entity. Encryption provides a mechanism for encrypting user data on a partition or volume basis. Software RAID provides one or more levels of RAID support (i.e. RAID-0, RAID-5, etc.). Mirroring provides support to make a duplicate copy of a volume, either locally or remotely.

Thus, it would be beneficial to have an apparatus and method for storing logical volume information at the top of each physical partition which is combined to create the logical volume.

SUMMARY OF THE INVENTION

A data processing system and method are disclosed for storing logical volume information used by a logical volume manager to create and manage a logical volume. The data processing system includes a plurality of storage devices. A plurality of physical partitions within the plurality of storage devices are specified. Each one of the physical partitions includes a plurality of sectors. The specified physical partitions are logically combined to create the logical volume. A first plurality of the sectors are reserved in each of the physical partitions for the logical volume information. The first plurality of sectors are located at the top of each of the physical partitions. The logical volume information is stored in the first plurality of sectors in each of the physical partitions. In this manner, the logical volume information is stored at the top of each of the physical partitions.

Other features and advantages of the present invention will be described in, or will become apparent to those of ordinary skill in the art in view of the following detailed description of the preferred embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

A preferred embodiment of the present invention and its advantages are better understood by referring to FIGS. 1–5 of the drawings, like numerals being used for like and corresponding parts of the accompanying drawings.

The invention is preferably realized using a well-known computing platform, such as an IBM personal computer, running the IBM OS/2 operating system. However, it may be realized in other popular computer system platforms, such as a Sun Microsystems workstation or IBM RS/6000 workstation, running alternate operating systems such as Microsoft Windows, HP-UX, UNIX or LINUX, without departing from the spirit and scope of the invention.

The present invention is a method and system for storing logical volume information used by a logical volume manager to create and manage a logical volume. In the present invention, the logical volume information is stored at the top of each physical partition which is combined to create the logical volume. For the first physical partition, the logical volume information is stored starting in the second sector, immediately after the boot sector. For all other physical partitions, the logical volume information is stored starting in the first sector of the partition.

The logical volume information includes logical volume data and logical volume signature information. The logical volume signature information includes a directory which identifies where in the LVM data area the data for each feature is stored. The logical volume data includes data for each feature of the logical volume manager and describes how to reconstruct the logical volume each time the system is booted.

The first physical partition will include, in order from the top of the partition, a boot sector, a logical volume (LVM) signature sector, logical volume (LVM) data sectors, and user data sectors. All other physical partitions will include first the LVM signature sector, then the LVM data sectors, and thereafter the user data sectors.

When an input/output (I/O) request is received, it references a logical volume and includes an offset into the logical volume. This offset is then mapped into a particular sector of the logical volume. Once the sector number of the logical volume is determined, the logical partition which includes this sector is determined along with an offset into the logical partition. At this time an offset into a particular logical partition is defined.

The first logical partition of a logical volume will include a boot sector and then user data sectors. All other logical partitions will include only user data sectors. The LVM signature and LVM data area are not included in the logical partitions. Therefore, in order to execute the I/O request, an offset into a logical partition must be mapped into a physical partition taking into consideration the LVM signature sector and LVM data area sectors which are stored at the top of each partition.

In order to correctly map the I/O request, the number of sectors used by the LVM signature sector and LVM data area sectors are first determined. The size of the LVM data area will vary from one logical volume to the next. Each feature included within a logical volume will request space in the LVM data area. As each feature is installed, LVM data area storage space is allocated for that feature. Therefore, the LVM data area will grow from the LVM signature sector down in the partition as space is allocated for each feature.

The offset into the logical partition is mapped into an offset into a physical partition by adding the offset into the logical partition to the number of sectors reserved for the LVM signature sector and LVM data area. For this first logical partition of the volume, the offset into the logical partition is added to the number of sectors allocated for the boot sector, and reserved for the LVM signature sector and the LVM data area sectors in order to determine a physical sector number. For all other logical partitions of the volume, the offset into the logical partition is added to the number of sectors reserved for the LVM signature sector and the LVM data area sectors in order to determine a physical sector number.

Figure 1:
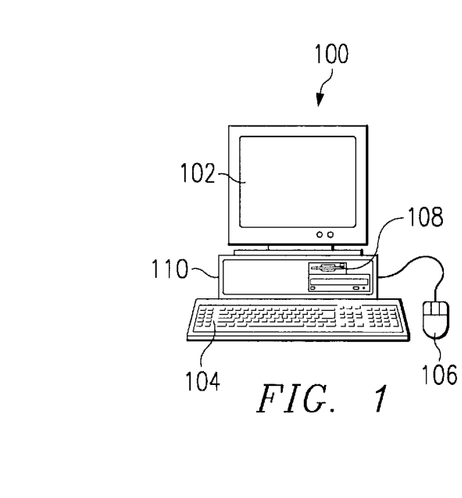
FIG. 1 is a pictorial representation of a data processing system according to the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
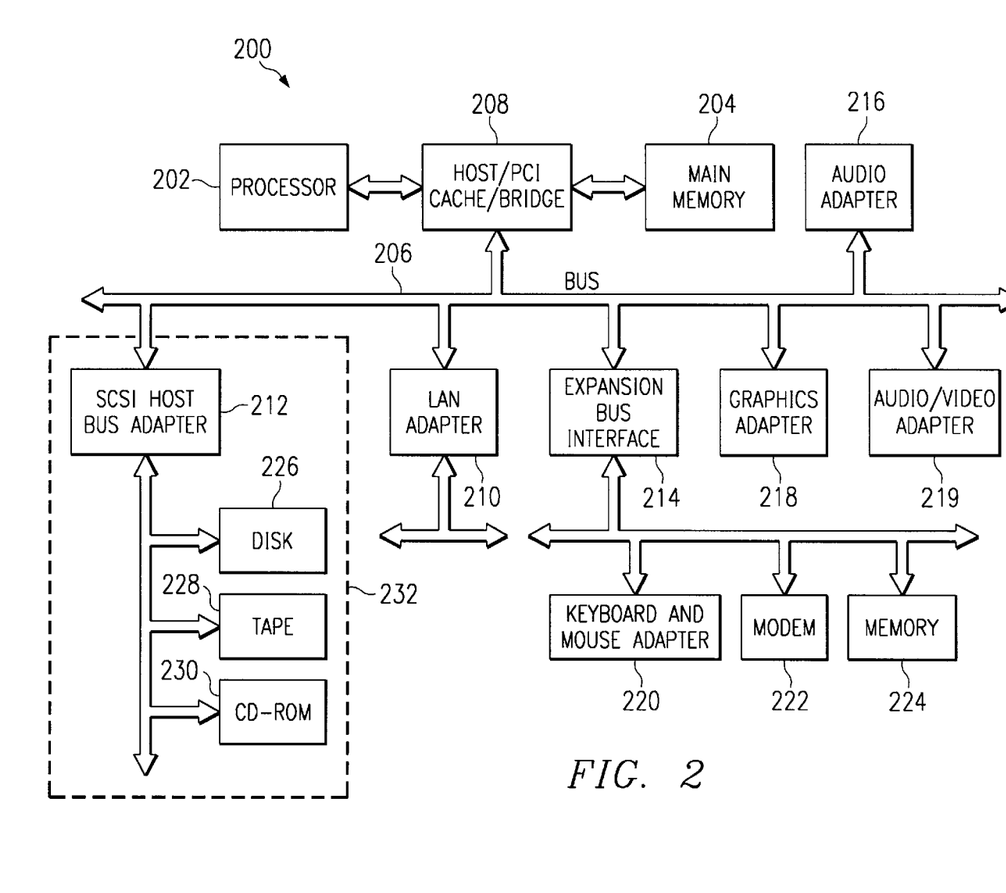
FIG. 2 depicts the fundamental software architecture of such a computer in accordance with the present invention.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as the AIX operating system available from International Business Machines. The AIX operating system is a UNIX-type operating system. In addition, other operating systems such as Windows 2000, available from Microsoft Corporation, or object oriented systems such as Java may run on data processing system 200. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
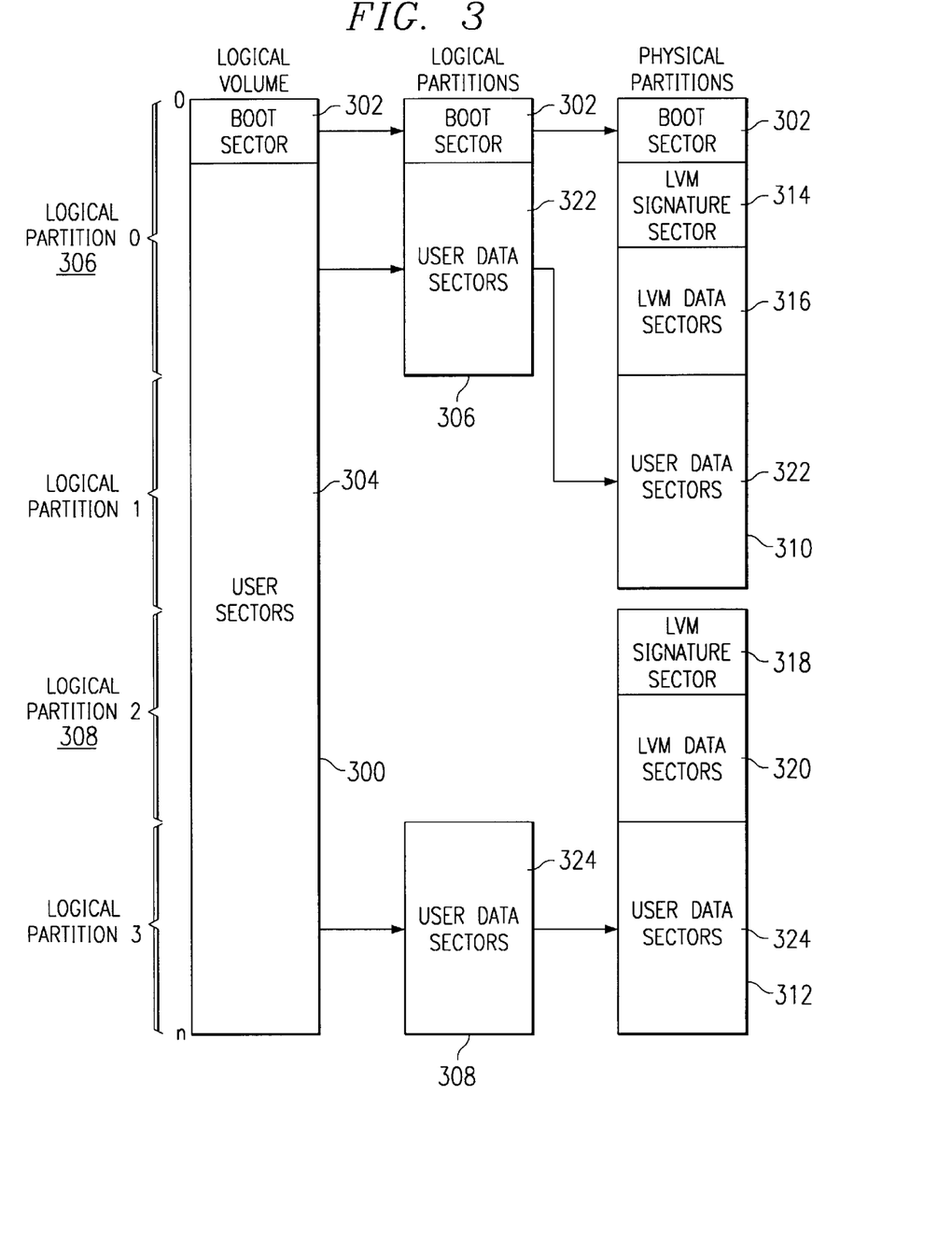
FIG. 3 is a high level block diagram of a logical volume, as well as logical partitions and physical partitions which map to the logical volume in accordance with the present invention.

FIG. 3 is a high level block diagram of a logical volume 300 and logical partitions and physical partitions which are combined to create the logical volume in accordance with the present invention. A logical volume 300 includes a boot sector 302 and user sectors 304. Logical volume 300 includes sectors 0–n. These sectors are divided into logical partitions, such as logical partition 306 and 308. Each logical partition maps to a physical partition where the information is actually stored. For example, logical partition 306 maps to physical partition 310, and logical partition 308 maps to physical partition 312. The boot sector 302 is included in the first logical partition 306 of the volume, and therefore, also in physical partition 310.

Logical volume information, including LVM signature information and LVM data, is stored at the top of each physical partition. In the first partition 310, the logical volume information is stored immediately after the boot sector. For all other physical partitions, such as partition 312, the logical volume information is stored at the very top of the partition. For example, partition 310 includes an LVM signature sector 314 and LVM data area 316. User data is stored immediately after the logical volume information. For example, partition 310 includes user data sectors 322. Partition 312 includes user data sectors 324.

The logical volume information is hidden and therefore not represented in the corresponding logical partitions. For example, physical partition 310 maps to logical partition 306. Boot sector 310 appears in both of these partitions, as do user sectors 322. However, LVM signature sector 314 and LVM data sectors 316 do not appear in logical partition 306.

Figure 4:
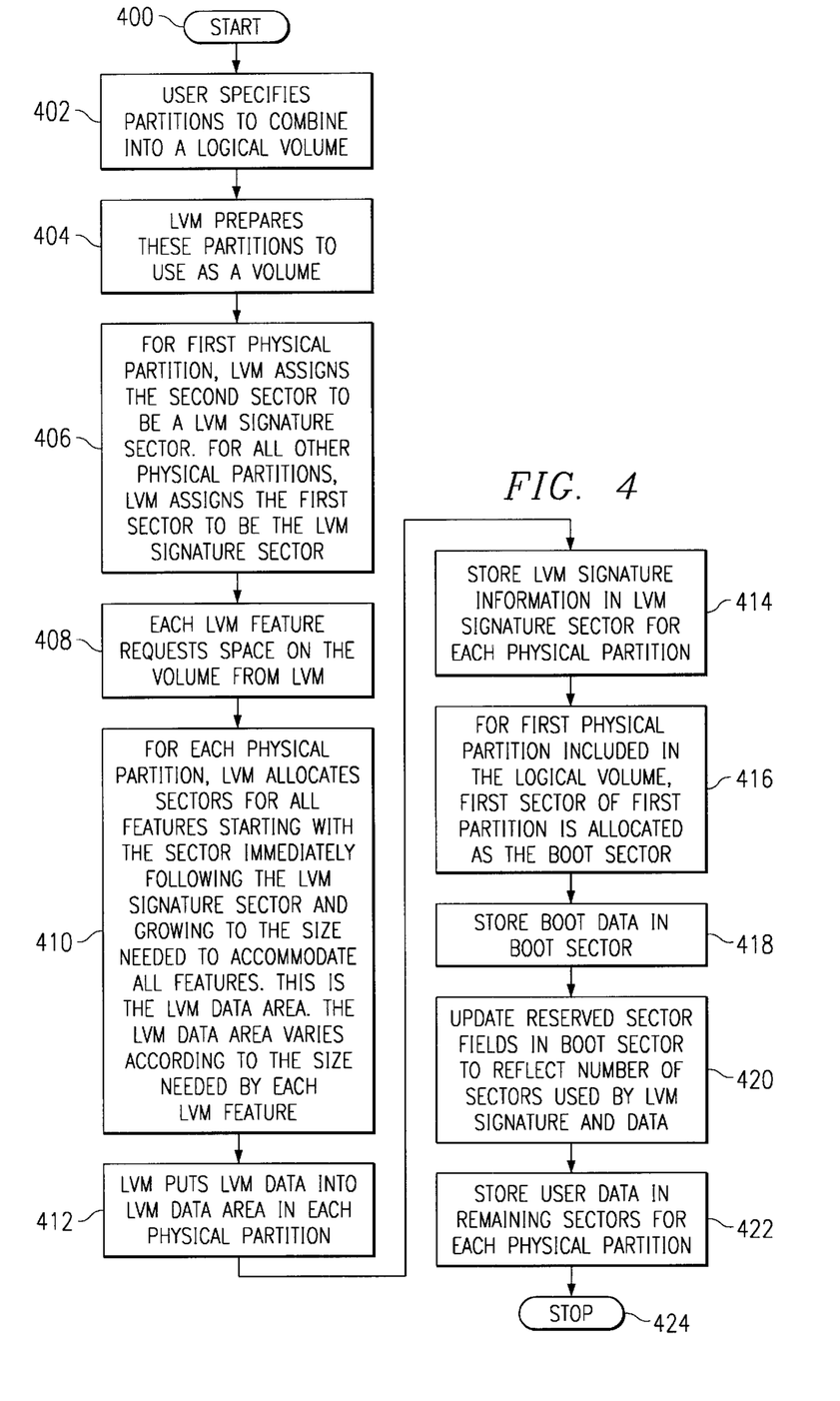
FIG. 4 is a high level flow chart which depicts a creation of a logical volume and the storage of logical volume data and signature information in physical partitions which comprise the logical volume in accordance with the method and system of the present invention.

FIG. 4 is a high level flow chart which depicts a creation of a logical volume and the storage of logical volume data and signature information in physical partitions which comprise the logical volume in accordance with the method and system of the present invention. The process starts as depicted by block 400 and thereafter passes to block 402 which illustrates a user specifying physical partitions to combine in order to create a logical volume. Next, block 404 depicts a logical volume manager (LVM) preparing these physical partitions to use as the logical volume. The process then passes to block 406 which illustrates the LVM assigning the second sector in the first physical partition and the first sector in all other physical partitions to be an LVM signature sector. An LVM signature sector contains a directory which identifies where in the LVM data area the data for each feature is stored. Thereafter, block 408 depicts each LVM feature requesting space on the volume from the LVM. Next, block 410 illustrates the LVM allocating physical sectors within each physical partition for all of the LVM features. The LVM starts allocating physical sectors starting at the top of the physical partition immediately following the LVM signature sector and then growing to the size needed to accommodate all features. These physical sectors then become the LVM data area in each physical partition. Therefore, the LVM data area varies according to the size of storage space required for each feature.

The process then passes to block 412 which depicts the LVM putting LVM data into the LVM data area in each physical partition. Next, block 414 illustrates storing LVM signature information in the LVM signature sector in each physical partition. Block 416, then, depicts the first sector of the first physical partition being allocated as a boot sector. The process then passes to block 418 which illustrates storing boot data in the boot sector. Thereafter, block 420 depicts updating reserved sector fields in the boot sector to reflect the number of sectors used by the LVM signature and data information. Next, block 422 illustrates storing user data in the remaining sectors for each physical partition. The process then terminates as depicted by block 424.

Figure 5:
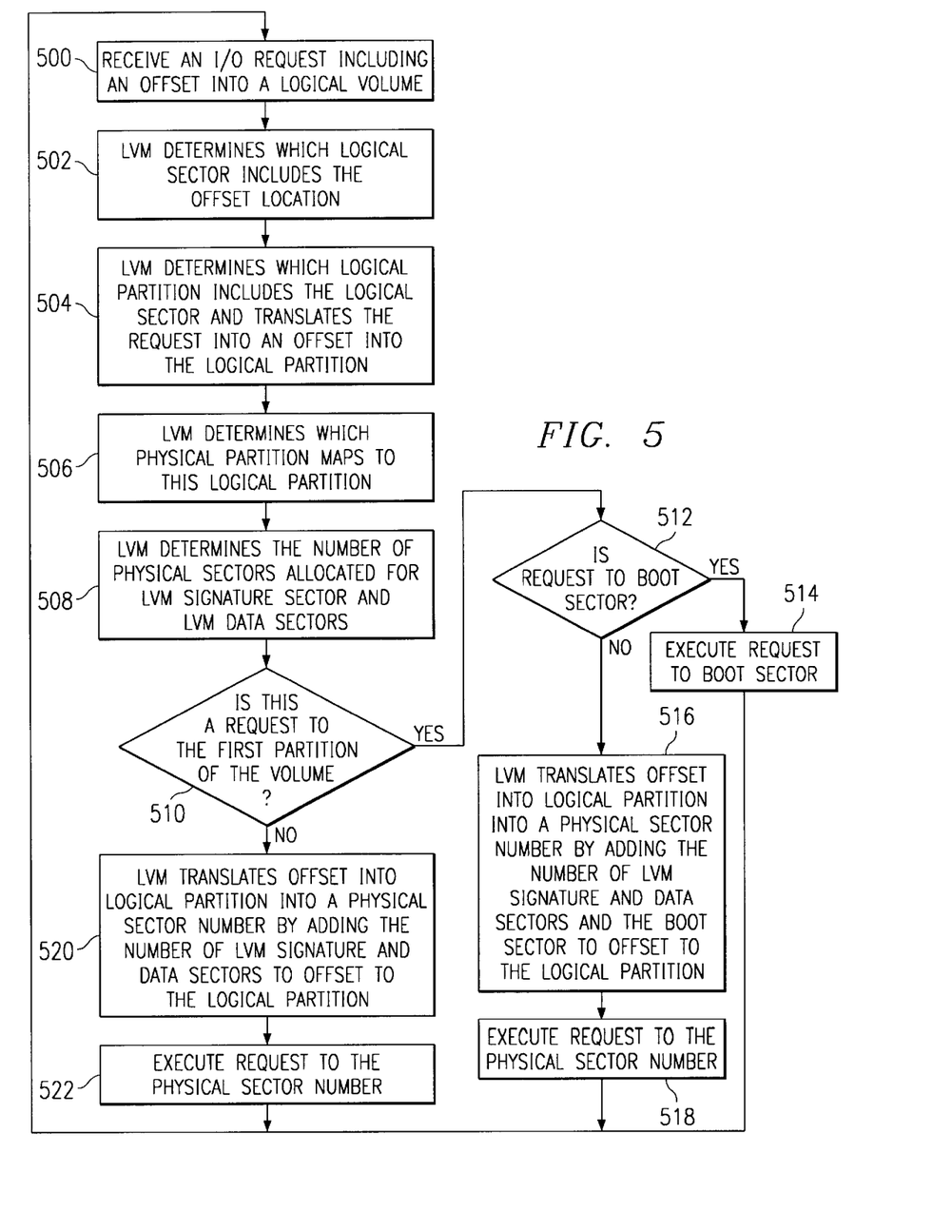
FIG. 5 is a high level flow chart which illustrates processing an input/output request to the logical volume and the mapping of the request in accordance with the method of the present invention.

FIG. 5 is a high level flow chart which illustrates processing an input/output request to the logical volume and the mapping of the request in accordance with the method of the present invention. The process starts as depicted by block 500 which illustrates the logical volume manager (LVM) receiving an input/output (I/O) request. The I/O request includes an offset into a logical volume. Next, block 502 depicts the LVM determining which logical sector includes the offset location. Next, block 504 illustrates the LVM determining which logical partition includes the logical sector. The LVM translates the request into an offset into that logical partition. Block 506, then, depicts the LVM determining which physical partition maps to this logical partition.

The process then passes to block 508 which depicts the LVM determining the number of physical sectors which are allocated for LVM signature and data information. Thereafter, block 510 illustrates a determination of whether or not this I/O request is to the first partition of the logical volume. If a determination is made that this is a request to the first partition, the process passes to block 512. Block 512 illustrates a determination of whether or not this I/O request is a request to the boot sector of the first logical partition of the volume. If a determination is made that this I/O request is a request to the boot sector of the first logical partition of the volume, the process passes to block 514 which depicts executing the I/O request to the boot sector. The process then passes back to block 500.

Referring again to block 512, if a determination is made that this I/O request is not a request to the boot sector of the first logical partition of the volume, the process passes to block 516 which depicts the LVM translating the offset into the logical partition into a physical sector number by adding the number of sectors allocated for the boot sector and reserved for the LMV signature and data sectors to the offset into the logical partition. Thereafter, block 518 illustrates executing the request to the physical sector number determined as depicted by block 516. The process then passes back to block 500.

Referring again to block 510, if a determination is made that this request is to a partition other than the first partition of the volume, the process passes to block 520 which illustrates the LVM translating the offset into the logical partition into a physical sector number by adding the number of LMV signature and data sectors to the offset into the logical partition. Thereafter, block 522 illustrates executing the request to the physical sector number determined as depicted by block 520. The process then passes back to block 500.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for storing logical volume information used by a logical volume manager to create and manage a logical volume, said data processing system including a plurality of storage devices, said method comprising the steps of:

specifying a plurality of physical partitions within said plurality of storage devices, each one of said plurality of physical partitions including a plurality of sectors;

logically combining said specified plurality of physical partitions to create said logical volume;

reserving a first plurality of said plurality of sectors in each of said plurality of physical partitions for said logical volume information, said first plurality of said plurality of sectors being located at a top of each of said specified plurality of physical partitions; and storing said logical volume information in said first plurality of said plurality of sectors in each of said plurality of physical partitions, wherein said logical information is stored at said top of each of said plurality of physical partitions.

2. The method according to claim 1, further comprising the steps of:

reserving a first one of said plurality of sectors in a first one of said plurality of physical partitions to be a boot sector; and said first plurality of said plurality of sectors being located starting at a second one of said plurality of sectors for said first one of said plurality of physical partitions.

3. The method according to claim 2, further comprising the step of said first plurality of said plurality of sectors being located starting at a first one of said plurality of sectors for all of said plurality of physical partitions other than said first one of said plurality of physical partitions.

4. The method according to claim 1, further comprising the step of assigning a second plurality of said plurality of sectors to be user data sectors, wherein said second plurality of said plurality of sectors is separate from said first plurality of said plurality of sectors and further wherein said second plurality of said plurality of sectors is located immediately after said first plurality of said plurality of sectors in each of said plurality of physical partitions.

5. The method according to claim 1, further comprising the steps of:

said logical volume manager including a plurality of features;

each one of said plurality of features requesting storage space allocation;

determining a storage size required for each one of said plurality of features; and allocating said first plurality of said plurality of physical sectors, said first plurality of said plurality of physical sectors being said storage size.

6. The method according to claim 1, further comprising the steps of:

said logical storage manager receiving an input/output request; and said logical storage manager determining one of said plurality of physical sectors which is identified by said input/output request utilizing said first plurality of said plurality of physical sectors.

7. The method according to claim 6, further comprising the steps of:

said logical storage manager mapping said input/output request to an offset into one of a plurality of logical partitions;

said logical storage manager determining one of said plurality of physical partitions which maps to said one of said plurality of logical partitions; and said logical storage manager mapping said offset into said one of said plurality of logical partitions into an offset into said determined one of said plurality physical partitions utilizing said first plurality of said plurality of sectors.

8. The method according to claim 6, wherein said step of said logical storage manager mapping said offset into said one of said plurality of logical partitions into an offset into said determined one of said plurality physical partitions utilizing said first plurality of said plurality of sectors further comprises the steps of:

said logical storage manager determining a number of said plurality of physical sectors reserved for said first plurality of said plurality of sectors; and said logical storage manager mapping said offset into said one of said plurality of logical partitions into an offset into said determined one of said plurality physical partitions by adding said offset to said number of said plurality of physical sectors.

9. The method according to claim 1, wherein said logical volume information includes logical volume data and logical volume signature information.

10. The method according to claim 9, further comprising the steps of:

reserving a first one of said first plurality of said plurality of sectors in each of said plurality of physical partitions for said logical volume signature; and reserving all of said first plurality of said plurality of sectors other than said first one of said first plurality of said plurality of sectors in each of said plurality of physical partitions for said logical volume data.

11. A data processing system for storing logical volume information used by a logical volume manager to create and manage a logical volume, said data processing system including a plurality of storage devices, comprising:

means for specifying a plurality of physical partitions within said plurality of storage devices, each one of said plurality of physical partitions including a plurality of sectors;

means for logically combining said specified plurality of physical partitions to create said logical volume;

means for reserving a first plurality of said plurality of sectors in each of said plurality of physical partitions for said logical volume information, said first plurality of said plurality of sectors being located at a top of each of said specified plurality of physical partitions; and means for storing said logical volume information in said first plurality of said plurality of sectors in each of said plurality of physical partitions, wherein said logical information is stored at said top of each of said plurality of physical partitions.

12. The system according to claim 11, further comprising:

means for reserving a first one of said plurality of sectors in a first one of said plurality of physical partitions to be a boot sector; and said first plurality of said plurality of sectors being located starting at a second one of said plurality of sectors for said first one of said plurality of physical partitions.

13. The system according to claim 12, further comprising said first plurality of said plurality of sectors being located starting at a first one of said plurality of sectors for all of said plurality of physical partitions other than said first one of said plurality of physical partitions.

14. The system according to claim 11, further comprising means for assigning a second plurality of said plurality of sectors to be user data sectors, wherein said second plurality of said plurality of sectors is separate from said first plurality of said plurality of sectors and further wherein said second plurality of said plurality of sectors is located immediately after said first plurality of said plurality of sectors in each of said plurality of physical partitions.

15. The system according to claim 11, further comprising:

means for said logical volume manager including a plurality of features;

means for each one of said plurality of features requesting storage space allocation;

means for determining a storage size required for each one of said plurality of features; and means for allocating said first plurality of said plurality of physical sectors, said first plurality of said plurality of physical sectors being said storage size.

16. The system according to claim 11, further comprising:

means for said logical storage manager receiving an input/output request; and means for said logical storage manager determining one of said plurality of physical sectors which is identified by said input/output request utilizing said first plurality of said plurality of physical sectors.

17. The system according to claim 16, further comprising:

means for said logical storage manager mapping said input/output request to an offset into one of a plurality of logical partitions;

means for said logical storage manager determining one of said plurality of physical partitions which maps to said one of said plurality of logical partitions; and means for said logical storage manager mapping said offset into said one of said plurality of logical partitions into an offset into said determined one of said plurality physical partitions utilizing said first plurality of said plurality of sectors.

18. The system according to claim 16, wherein said means for said logical storage manager mapping said offset into said one of said plurality of logical partitions into an offset into said determined one of said plurality physical partitions utilizing said first plurality of said plurality of sectors further comprises:

means for said logical storage manager determining a number of said plurality of physical sectors reserved for said first plurality of said plurality of sectors; and means for said logical storage manager mapping said offset into said one of said plurality of logical partitions into an offset into said determined one of said plurality physical partitions by adding said offset to said number of said plurality of physical sectors.

19. The system according to claim 11, wherein said logical volume information includes logical volume data and logical volume signature information.

20. The system according to claim 19, further comprising:

means for reserving a first one of said first plurality of said plurality of sectors in each of said plurality of physical partitions for said logical volume signature; and means for reserving all of said first plurality of said plurality of sectors other than said first one of said first plurality of said plurality of sectors in each of said plurality of physical partitions for said logical volume data.

21. A computer program product for storing logical volume information used by a logical volume manager to create and manage a logical volume, said data processing system including a plurality of storage devices, said computer program product comprising:

instruction means for specifying a plurality of physical partitions within said plurality of storage devices, each one of said plurality of physical partitions including a plurality of sectors;

instruction means for logically combining said specified plurality of physical partitions to create said logical volume;

instruction means for reserving a first plurality of said plurality of sectors in each of said plurality of physical partitions for said logical volume information, said first plurality of said plurality of sectors being located at a top of each of said specified plurality of physical partitions; and instruction means for storing said logical volume information in said first plurality of said plurality of sectors in each of said plurality of physical partitions, wherein said logical information is stored at said top of each of said plurality of physical partitions.

22. The computer program product according to claim 21, further comprising:

instruction means for reserving a first one of said plurality of sectors in a first one of said plurality of physical partitions to be a boot sector; and said first plurality of said plurality of sectors being located starting at a second one of said plurality of sectors for said first one of said plurality of physical partitions.

23. The computer program product according to claim 22, further comprising said first plurality of said plurality of sectors being located starting at a first one of said plurality of sectors for all of said plurality of physical partitions other than said first one of said plurality of physical partitions.

24. The computer program product according to claim 21, further comprising instruction means for assigning a second plurality of said plurality of sectors to be user data sectors, wherein said second plurality of said plurality of sectors is separate from said first plurality of said plurality of sectors and further wherein said second plurality of said plurality of sectors is located immediately after said first plurality of said plurality of sectors in each of said plurality of physical partitions.

25. The computer program product according to claim 21, further comprising:

instruction means for said logical volume manager including a plurality of features;

instruction means for each one of said plurality of features requesting storage space allocation;

instruction means for determining a storage size required for each one of said plurality of features; and instruction means for allocating said first plurality of said plurality of physical sectors, said first plurality of said plurality of physical sectors being said storage size.

26. The computer program product according to claim 21, further comprising:

instruction means for said logical storage manager receiving an input/output request; and instruction means for said logical storage manager determining one of said plurality of physical sectors which is identified by said input/output request utilizing said first plurality of said plurality of physical sectors.

27. The computer program product according to claim 26, further comprising:

instruction means for said logical storage manager mapping said input/output request to an offset into one of a plurality of logical partitions;

instruction means for said logical storage manager determining one of said plurality of physical partitions which maps to said one of said plurality of logical partitions; and instruction means for said logical storage manager mapping said offset into said one of said plurality of logical partitions into an offset into said determined one of said plurality physical partitions utilizing said first plurality of said plurality of sectors.

28. The computer program product according to claim 26, wherein said instruction means for said logical storage manager mapping said offset into said one of said plurality of logical partitions into an offset into said determined one of said plurality physical partitions utilizing said first plurality of said plurality of sectors further comprises:

instruction means for said logical storage manager determining a number of said plurality of physical sectors reserved for said first plurality of said plurality of sectors; and instruction means for said logical storage manager mapping said offset into said one of said plurality of logical partitions into an offset into said determined one of said plurality physical partitions by adding said offset to said number of said plurality of physical sectors.

29. The computer program product according to claim 21, wherein said logical volume information includes logical volume data and logical volume signature information.

30. The computer program product according to claim 19, further comprising:

instruction means for reserving a first one of said first plurality of said plurality of sectors in each of said plurality of physical partitions for said logical volume signature; and instruction means for reserving all of said first plurality of said plurality of sectors other than said first one of said first plurality of said plurality of sectors in each of said plurality of physical partitions for said logical volume data.

* * * * *